US008480238B2

(12) United States Patent
Huang et al.

(10) Patent No.: US 8,480,238 B2
(45) Date of Patent: Jul. 9, 2013

(54) PROJECTOR ARRAY FOR MULTIPLE IMAGES

(75) Inventors: Hung Khei Huang, Irvine, CA (US); Sangwon Chae, Irvine, CA (US); Yasuhiro Komori, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 12/912,705

(22) Filed: Oct. 26, 2010

(65) Prior Publication Data
US 2012/0099081 A1 Apr. 26, 2012

(51) Int. Cl.
G03B 21/26 (2006.01)

(52) U.S. Cl.
USPC .............................................. 353/94; 345/644

(58) Field of Classification Search
USPC .................... 353/30, 94; 345/644, 647, 648
See application file for complete search history.

(56) References Cited

U.S. PATENT DOCUMENTS

| | | | |
|---|---|---|---|
| 6,755,537 B1 | 6/2004 | Raskar et al. | 353/94 |
| 6,811,264 B2 | 11/2004 | Raskar et al. | 353/94 |
| 7,119,833 B2 | 10/2006 | Jaynes et al. | 348/189 |
| 7,163,296 B2 | 1/2007 | Sakai | 353/69 |
| 7,239,331 B2 | 7/2007 | Chernichenko et al. | 345/647 |
| 7,705,862 B1 | 4/2010 | Teng | 345/647 |
| 2003/0043303 A1* | 3/2003 | Karuta et al. | 348/744 |
| 2004/0184010 A1* | 9/2004 | Raskar et al. | 353/94 |
| 2004/0184011 A1* | 9/2004 | Raskar et al. | 353/94 |
| 2007/0257941 A1* | 11/2007 | Plut | 345/660 |
| 2008/0002160 A1 | 1/2008 | Chang et al. | 353/94 |
| 2008/0062164 A1 | 3/2008 | Bassi et al. | 345/214 |
| 2008/0100805 A1 | 5/2008 | Majumder et al. | 353/30 |
| 2008/0143969 A1 | 6/2008 | Aufranc et al. | 353/30 |
| 2008/0143978 A1* | 6/2008 | Damera-Venkata et al. | 353/94 |
| 2008/0291402 A1 | 11/2008 | Kobayashi | 353/69 |
| 2009/0027629 A1* | 1/2009 | Yonezawa | 353/70 |
| 2009/0115915 A1 | 5/2009 | Steinberg et al. | 348/745 |
| 2009/0310100 A1* | 12/2009 | Kondo | 353/122 |

OTHER PUBLICATIONS

Sukthankar, Rahul, et al., "Automatic Keystone Correction for Camera-Assisted Presentation Interfaces", Advances in Multimodal Interfaces—Proceedings of ICMI, 2000, 8 pages.

* cited by examiner

*Primary Examiner* — Kee M Tung
*Assistant Examiner* — Ryan D McCulley
(74) *Attorney, Agent, or Firm* — Fitzpatrick, Cella, Harper & Scinto

(57) ABSTRACT

A projector array includes a plurality of projectors, which together project images into a projection area on a projection surface. Aspect ratios are normalized for all of multiple images designated for display. The normalized aspect ratios are aligned at a common central point. An aspect ratio of a minimum rectangular shape is determined that will encompass all of the aligned aspect ratios. A maximum rectangular projection area is determined within the projection area having the same aspect ratio as the minimum rectangular shape. The center of the maximum rectangular area is designated as a centralization point. Each of all of the multiple images is sequentially projected into the projection area. Each image is scaled for display at its aspect ratio and is displayed centered at the centralization point.

29 Claims, 9 Drawing Sheets

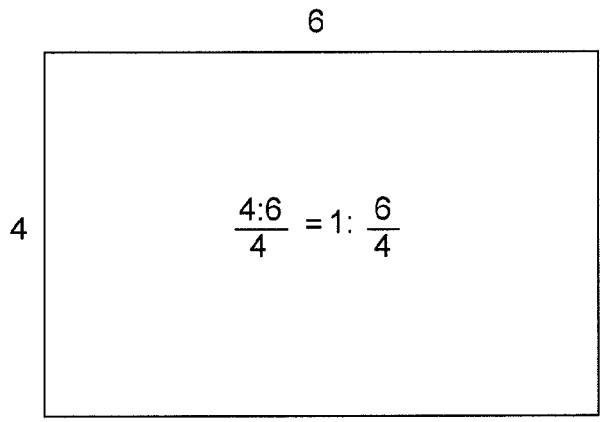
FIG. 4A
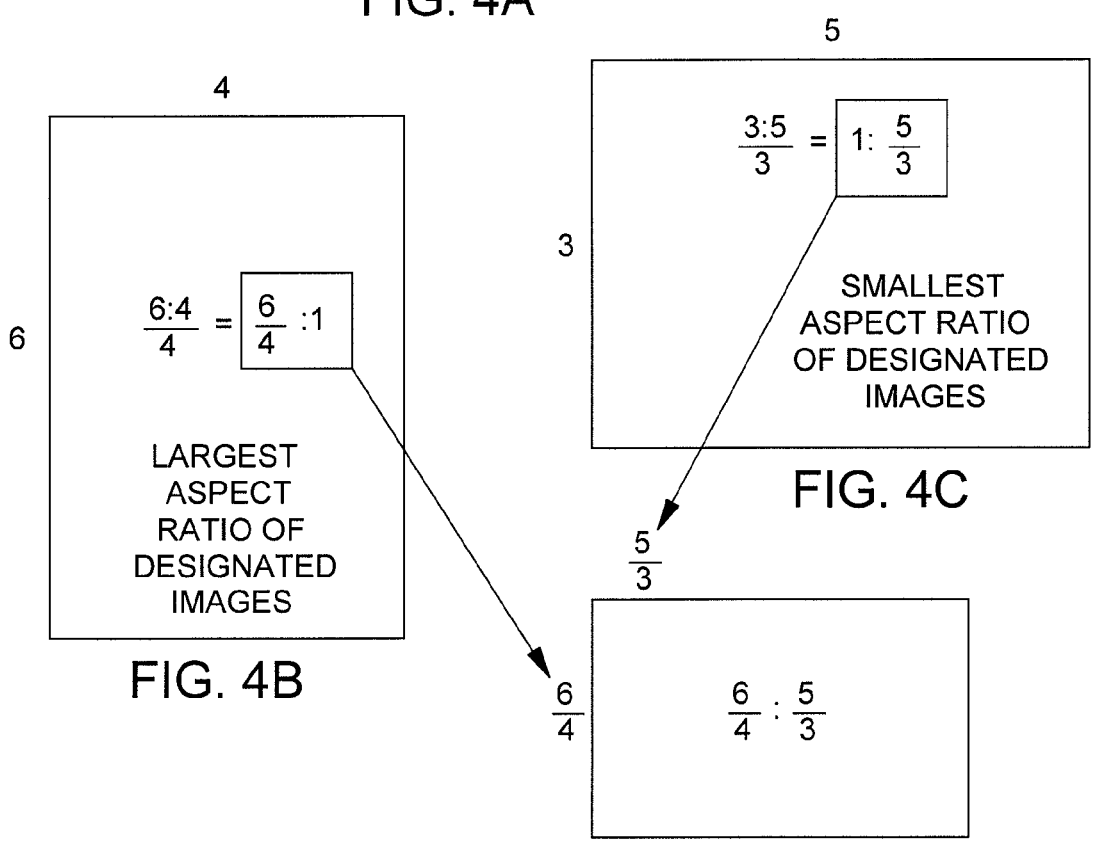
FIG. 4B
FIG. 4C
FIG. 4E
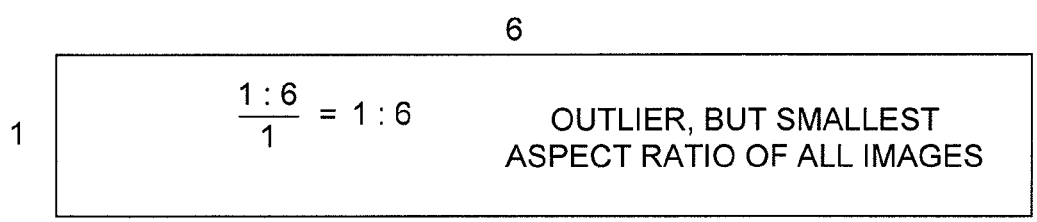
FIG. 4D

PROJECTOR ARRAY FOR MULTIPLE IMAGES

FIELD

The present disclosure relates to image projection and, more specifically, to display of multiple images by a projector array into a projection area on a projection surface.

BACKGROUND

Keystone correction is typically used to correct an image being projected by a projection system, in which the image would otherwise be distorted principally due to an angle of projection from the projection system to the projection surface (e.g., projection screen). Typically, keystone correction is applied to a projection system so as to obtain a homography transformation that results in good image fidelity between a source image and a projected image. When the projection system includes multiple projectors in a projector array, the homography transformation is ordinarily derived for a single object, regardless of the number of objects actually formed by the projection system.

As such, using keystone correction in a projection system with multiple projectors in a projector array may cause image distortion and distraction for viewers. Accordingly, there is a desire to improve image quality when performing such keystone correction.

SUMMARY

Disclosed embodiments describe the display of images with a projector array comprising a plurality of projectors. Each image of a plurality of images is projected into a projection area so as to maintain the center of the projected images at a fixed centralized point, which is used for all of the multiple images, while also projecting the images at the aspect ratio of each image.

Thus, in an example embodiment described herein, a projector array includes a plurality of projectors, which together, project images into a projection area on a projection surface. Aspect ratios are normalized for all of multiple images designated for display. The normalized aspect ratios are aligned at a common central point. An aspect ratio of a minimum rectangular shape is determined that will encompass all of the aligned aspect ratios. A maximum rectangular projection area is determined within the projection area having the same aspect ratio as the minimum rectangular shape. The center of the maximum rectangular projection area is designated as a centralization point. Each of all of the multiple images is sequentially projected into the projection area. Each image is scaled for display at its aspect ratio and is displayed centered at the centralization point.

By virtue of this arrangement, it is ordinarily possible to project one or more images with reduced keystone distortions while automatically centering the projected images at an identified centralized point that is based on the aspect ratios of all images designated for display, while also providing dynamic aspect ratio adjustment such that each of the images are scaled at their respective aspect ratio.

In example embodiments, a common homography matrix is calculated based on the maximum rectangular projection area. Also, for each individual one of the multiple images, projection includes scaling the image at its aspect ratio to a maximum rectangular image area within the maximum rectangular projection area and applying the inverse of the common homography matrix to the scaled image so as to obtain a modified image; and projecting the modified image.

In other example embodiments, for each individual one of the multiple images, the projection includes a calculation of an individualized maximum rectangular image area for the image based on the aspect ratio of the image and based on the centralization point. The projection also includes a calculation of an individualized homography matrix for the individualized maximum rectangular image area for the image. Moreover, the projection includes an application of the inverse of the individualized homography matrix to the image so as to obtain a modified image, and a projection of the modified image. Accordingly, scaling of the image is not ordinarily needed because an inverse of the individualized homography matrix is applied to the image.

In other example embodiments, the multiple images targeted for display are obtained by excluding an outlier image from a set of plural images. In one embodiment, the outlier image has an aspect ratio which is inconsistent with the aspect ratios of the multiple images targeted for display. In another embodiment, the outlier image is projected, scaled at its aspect ratio to fit within a maximum rectangular area determined for the outlier image while being centered at a position other than the centralization point. For example, due to the aspect ratio of the image and the available projection area, it may be determined that the outlier image is better viewed around a center point other than the centralization point. However, in yet another embodiment, the outlier image is projected, scaled at its aspect ratio to a maximum rectangular area centered at the centralization point.

An example of identifying the outlier images for exclusion is provided. For example, in one embodiment the number of different aspect ratios is determined for all of the multiple images designated for display, an average number of images is calculated for each different aspect ratio based on the total number of images designated for display and the number of different aspect ratios determined, and a threshold number of images is calculated for each of the different aspect ratios determined. Identified for exclusion are all images corresponding to each aspect ratio having fewer than the threshold number of images. In another example embodiment, the threshold number of images is calculated by multiplying a predetermined threshold percentage by the average number of images calculated.

In other example embodiments, the projection area is detected by corner detection using an image capture device which captures an image of the projection surface.

In other example embodiments, normalizing aspect ratios includes, for each aspect ratio of each designated image, scaling the aspect ratio by the smaller of the width and the height of the image to calculate a normalized aspect ratio. In one embodiment, the aspect ratio of a minimum rectangular shape is determined to be the ratio of the largest scaled aspect ratio and the smallest scaled aspect ratio.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 4 shows a representative group of images with normalized aspect ratio and an exemplary determination of an aspect ratio encompassing the normalized aspect ratios according to an example embodiment.

DETAILED DESCRIPTION

Figure 1:
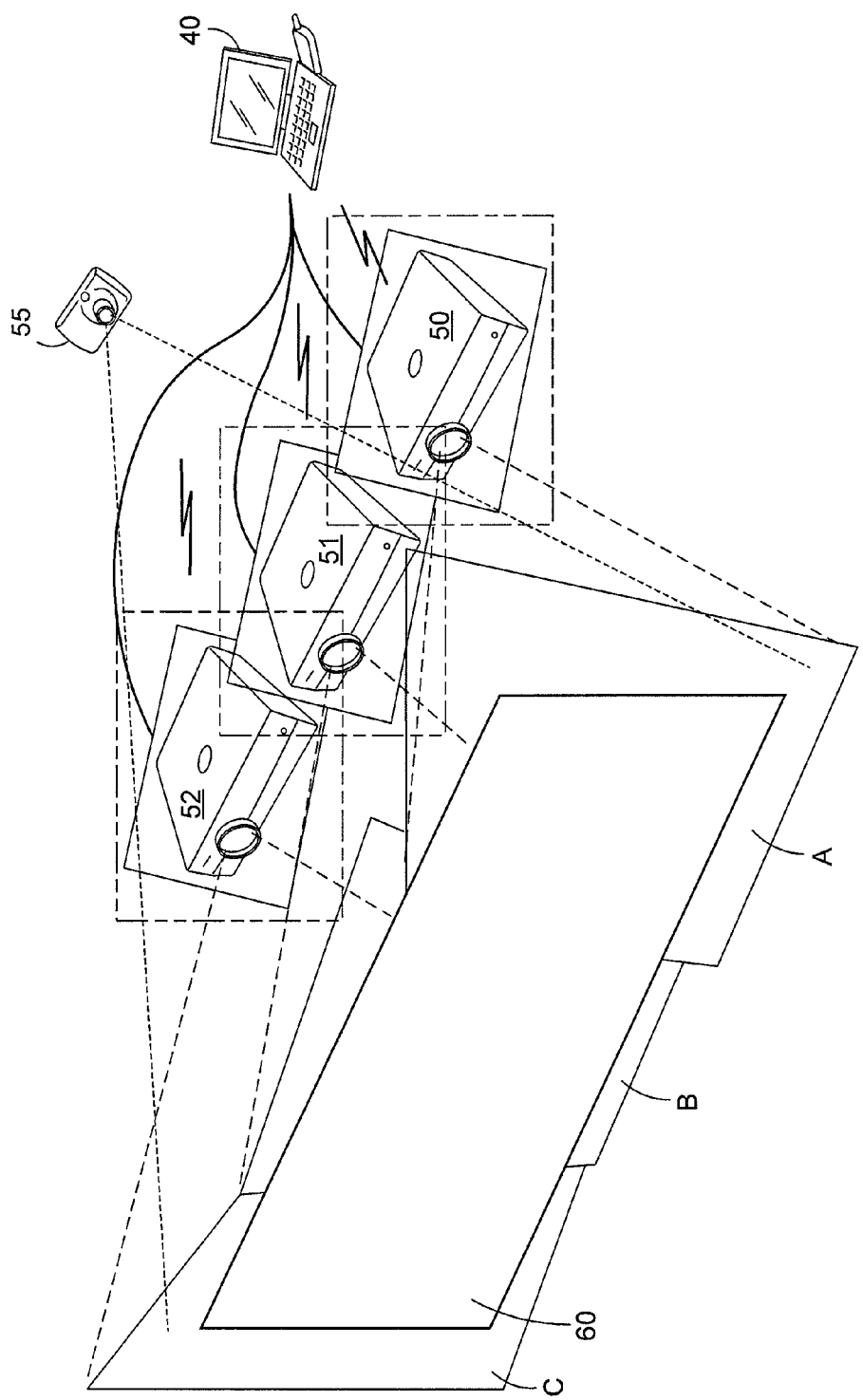
FIG. 1 is a representative view of a multiprojector system relevant to one example embodiment.

FIG. 1 is a representative view of a multiprojector system 100 including a projector array comprised of projectors 50 to 52, a host computer 40 and camera 55, relevant to one example embodiment. Host computer 40 generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Host computer 40 includes a color monitor including a display screen, a keyboard for entering text data and user commands, and a pointing device. Pointing device preferably comprises a mouse for pointing and for manipulating objects displayed on the display screen.

Host computer 40 also includes computer-readable memory media such as a computer hard disk and a DVD disk drive, which are constructed to store computer-readable information such as computer-executable process steps. The DVD disk drive provides a means whereby the host computer can access information, such as image data, computer-executable process steps, application programs, etc. stored on removable memory media. In an alternative, information can also be retrieved through other computer-readable media such as a USB storage device connected to a USB port, or through a network interface. Other devices for accessing information stored on removable or remote media may also be provided.

Host computer 40 may acquire image data from other sources such as a digital camera, a local area network or the Internet via a network interface. Likewise, host computer 40 may interface with color output devices other than projectors 50 to 52, such as color output devices accessible over the network interface.

Host computer 40 acquires image data for an input image, and provides pre-distorted image data to each of projectors 50 to 52 such that corresponding image 60 is displayed on a projection surface with reduced keystone distortion. In addition, the image data is provided for display by projectors 50 to 52 such that the image 60 is displayed at the aspect ratio of the image and displaying the images at a single centralization point based on a plurality of images designated for display.

In this example, projectors 50 to 52 are RGB or RGBW projectors, such as DLP™ digital projectors or other display devices that project images in accordance with image data from the host computer 40 onto a projection surface. Projectors 50 to 52 may be HDR devices capable of projecting HDR images, and may further include, for example, LCD projectors, LCOS projectors, LED projectors.

Together, projectors 50 to 52 make up a projector array, and in accordance with image data received from host computer 40, projectors 50 to 52 project image 60 onto a projection screen by using additive light combinations of red (R), green (G) and blue (B) colorant lights. In addition, and particularly in a case of an HDR device, projectors 50 to 52 also use a white (W) light so as to increase the brightness/luminance of projected images and thereby project HDR images with good fidelity over a large dynamic range.

Digital color camera 55 is an example of a color input device, and is provided for sending digital image data to host computer 40. In particular, digital color camera 55 captures images of the projection surface of the projector array in order to facilitate control of the multiprojector system.

FIG. 1 shows an example of a projector array where projectors 50 to 52 are positioned to form one single image 60. As shown in FIG. 1, projector 50 displays individual projection area A, projector 51 displays individual projection area B and projector 52 displays individual projection area C. In other words, individual projection areas A, B and C are respectively displayed by projectors 50, 51 and 52. In this example, image data is provided by host computer 40 such that each of projectors 50 to 52 displays the appropriate portion of image 60 on the single object on the projection surface.

Figure 2:
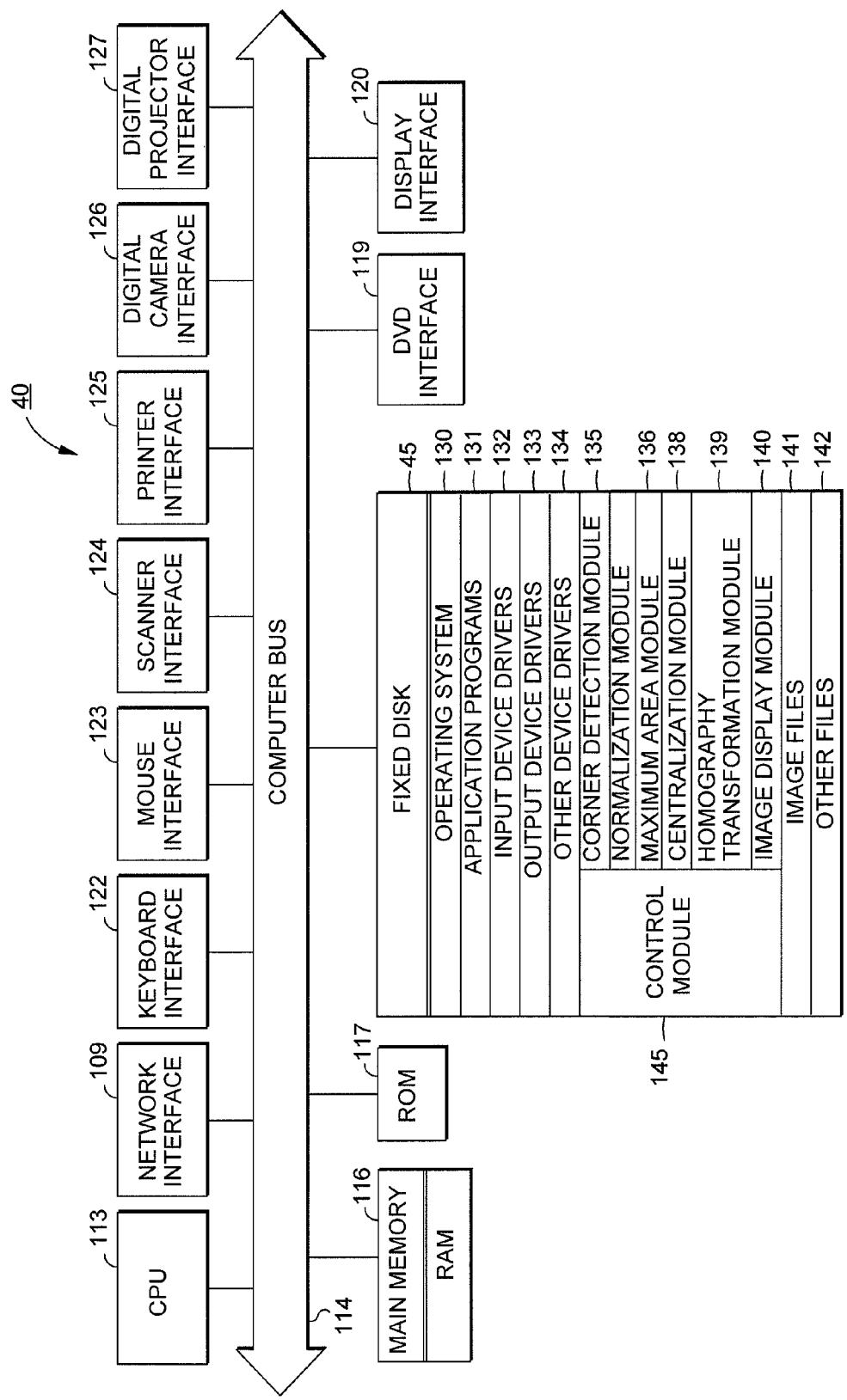
FIG. 2 is a detailed block diagram depicting the internal architecture of the host computer shown in FIG. 1.

FIG. 2 is a detailed block diagram showing the internal architecture of host computer 40. As shown in FIG. 2, host computer 40 includes central processing unit (CPU) 113 which may be a multi-core CPU and which interfaces with computer bus 114. Also interfacing with computer bus 114 are fixed disk 45, network interface 109, random access memory (RAM) 116 for use as a main run-time transient memory, read only memory (ROM) 117, DVD disk interface 119, display interface 120 for a monitor, keyboard interface 122 for a keyboard, mouse interface 123 for a pointing device, digital projector interface 124 for projector 50, digital projector interface 125 for projector 51, digital projector interface 126 for projector 52, and digital camera interface 127 for digital camera 55.

RAM 116 interfaces with computer bus 114 so as to provide information stored in RAM 116 to CPU 113 during execution of the instructions in software programs such as an operating system, application programs, control modules, and device drivers. More specifically, CPU 113 first loads computer-executable process steps from fixed disk 45, or another storage device into a region of RAM 116. CPU 113 can then execute the stored process steps from RAM 116 in order to execute the loaded computer-executable process steps. Data such as color images or other information can be stored in RAM 116, so that the data can be accessed by CPU 113 during the execution of computer-executable software programs, to the extent that such software programs have a need to access and/or modify the data.

As also shown in FIG. 2, fixed disk 45 stores computer-executable process steps for operating system 130, and application programs 131, such as graphic image management programs. Fixed disk 45 also stores computer-executable process steps for device drivers for software interface to devices, such as input device drivers 132, output device drivers 133, and other device drivers 134, such as drivers for projectors 50, 51 and 52. Image files 141, including color image files, and other files 142 are available for output to color output devices and for manipulation by application programs.

Control module 145 comprises computer-executable process steps executed by a computer for control of a multiprojector system, where the multiprojector system includes multiple projectors arranged in a projector array. Control module 145 controls the multiprojector system such that an image is projected into a projection area on a projection surface. Briefly, control module 145 controls the projector array so that multiple images designated for display are projected in respective maximum image area rectangles at the respective aspect ratios of the images. The multiple images designated for display are displayed around a common centralization point that is based in part on normalized aspect ratios of the multiple images designated for display. Each image of the multiple images designated for display is sequentially projected into the projection area centered at the centralization point.

As shown in FIG. 2, control module 145 includes, at least, computer-executable process steps for plural modules of this embodiment, including corner detection module 135, normalization module 136, maximum area module 137, centralization module 138, homography transformation module 139, and image display module 140.

Corner detection module 135 is constructed to detect a corner of each individual projection area projected by each of projectors 50 to 52 in order to determine the projection area on the projection surface. For example, in the example shown in FIG. 1, corner detection module is constructed to detect the corners of individual projection areas A, B and C corresponding, respectively, to projectors 50, 51 and 52 of the projector array. The corners of the individual projection areas are detected by causing digital camera 55 to capture an image of each individual projection area projected by each of the projectors in the projector array, and analyzing the captured image. A virtual Cartesian coordinate system can be used to designate the coordinates of the corners and the boundaries of the projection area connecting the corners. The boundary of the projection area will then be used as a limit on the maximum size of the displayed images within the projection area.

Normalization module (136) is constructed to normalize aspect ratios for all of the multiple images designated for display by the projector array. The aspect ratios of the multiple images designated for display are identified and normalized to determine an aspect ratio of a minimum rectangular shape that encompasses all of the normalized aspect ratios of the multiple images.

Maximum area module 137 is constructed, at least in part, to identify a maximum rectangular projection area within the projection area detected by the corner detection module 135 at the minimum aspect ratio determined from the normalization module 136. Maximum area module 137 provides the maximum rectangular projection area to the centralization module 137.

Centralization module 138 is constructed to designate a centralization point of the maximum rectangular projection area. The centralization point designated is the point around which all of the designated images are projected. Centralization module 138 provides the centralization point to the maximum area module 137 to determine a maximum rectangular image area in which to project the input image. The maximum rectangular image area is based at least on the aspect ratio of the image and the centralization point.

Homography transformation module 139 is constructed to derive homography transformations for projectors 50 to 52 in order to facilitate keystone correction. Homography transformation module 139 derives a homography matrix, and an inverse of the derived homography matrix, for each of the projectors involved in the projection of each image. The inverse homography matrix is output to the image display module 140 for modification (e.g., keystone correction) of the input image.

Image display module 140 is constructed to calculate a modified image based upon the output from the homography transformation module 139, the maximum area module 137, and the input image itself. Such a modified image is modified to fit in the maximum rectangular image area for the input image at the aspect ratio of the input image and be centered at the designated centralization point that is common to all of the designated input images. Image display module 140 provides the modified image data to each of the projectors 50 to 52 for display on the projection surface.

The computer-executable process steps for control module 145 may be configured as a part of operating system 130, as part of an output device driver such as a projector driver, or as a stand-alone application program such as a multiprojector management system. They may also be configured as a plug-in or dynamic link library (DLL) to the operating system, device driver or application program. For example, control module 145 according to example embodiments may be incorporated in an output device driver for execution in a computing device, such as a projector driver, embedded in the firmware of an output device, such as a projector, or provided in a stand-alone application for use on a general purpose computer. In one example embodiment, control module 145 is incorporated directly into the operating system for general purpose host computer 40. It can be appreciated that the present disclosure is not limited to these embodiments and that the disclosed control module may be used in other environments for control of a multiprojector system.

Figure 3:
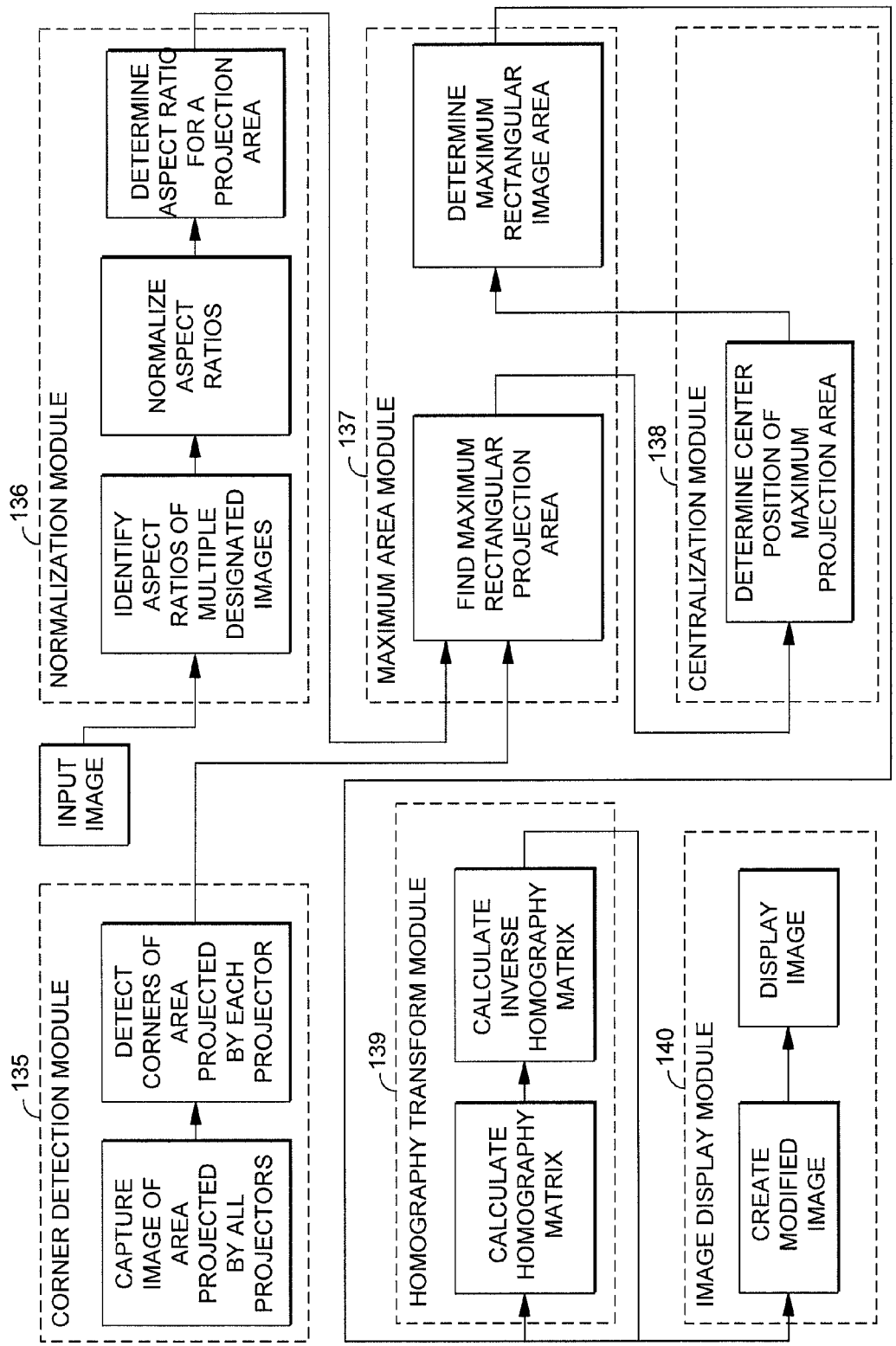
FIG. 3 is a view for explaining software architecture of a control module for a multiprojector system according to an example embodiment.

FIG. 3 is a view for explaining software architecture of control module 145 for a multiprojector system according to an example embodiment. As shown in FIG. 3, corner detection module 135 controls the multiprojector system such that camera 55 captures an image of a projection area projected by all projectors 50 to 52. Corner detection module 135 analyzes that captured image in order to determine the extent of the projection area on the projection surface. In particular, corner detection module outputs coordinates for each of the corners of each of the individual projection areas displayed by projectors 50 to 52, and corners caused by overlapping individual projection areas.

In this embodiment, the corners of each of the individual projection areas, such as areas A, B and C in FIG. 1, on the projection surface are detected by analyzing the captured image using, for example, a Canny algorithm to determine the coordinates of each of the corners of the individual projection areas. Of course, any other suitable method of determining the extent of the projection area on a projection surface may be used. The coordinates of the corners of each individual projection area are output to the maximum area module 137.

Normalization module 136 accepts, as input, the aspect ratios of all of the input images designated for display. All of the aspect ratios are normalized and compared to each other to determine a minimum rectangular shape that encompasses all of the normalized aspect ratios. In one embodiment, normalizing includes, for each aspect ratio of each designated image, the aspect ratio of each image is scaled by the smaller of the width and the height of the image.

An example of such a normalization is shown by way of reference to FIGS. 4A to 4E. FIG. 4A shows an image that is nominally 4 units tall and 6 units wide has an aspect ratio of 4:6. The smaller of these dimensions is the height, 4, and thus the normalized aspect ratio is 1:6/4. FIG. 4B shows an image that is 6 units tall and 4 units wide has an aspect ratio of 6:4. The smaller of these dimensions is the width, 4, and thus the normalized aspect ratio of this image is 6/4:1. FIG. 4C shows an image that is 3 units tall and 5 units wide that has an aspect ration of 3:5. The smaller of these dimensions is the height, 3, and thus the normalized aspect ratio of this image is 1:5/3.

FIGS. 4A to 4C depict multiple images designated for display. Among FIGS. 4A to 4C, FIG. 4B has the largest normalized aspect ratio and FIG. 4C has the smallest normalized aspect ratio. FIG. 4E shows a representation of a rectangle having an aspect ratio which is the ratio of the largest normalized aspect ratio to the smallest normalized aspect ratio among the designated images. As a result, the aspect ratio of the rectangle in FIG. 4E is 6/4:5/3. It is noted that the resulting aspect ratio determined in the manner just described by way of example might lead to an image scaling that is not necessarily optimized for the display of some of the plurality of images designated for display. However, the resulting aspect ratio determined by the normalization module 136 is believed to result in a compromise among the various aspect ratios of the designated images.

Returning to FIG. 3 and the modules depicted therein, maximum area module 137 accepts, as input, the coordinates of the corners of each individual projection area, the input image data, a centralization point (discussed below), and the minimum aspect ratio from the normalization module 136. The input image data includes the aspect ratio of the input image. The maximum area module 137 uses the minimum aspect ratio from the normalization module to determine a maximum rectangular projection area and its coordinates within the projection area having the determined minimum aspect ratio. The coordinates of the maximum rectangular projection area are output to a centralization module 138 which determines the centralization point within the maximum rectangular projection area.

The maximum area module 137 also receives an input from centralization module 137. The centralization module 138 outputs the centralization point to the maximum area module 137. A further maximum rectangular image area is determined for the input image centered around the centralization point. The maximum rectangular image area is based in part on the aspect ratio of the input image and the centralization point. In one embodiment, discussed further hereinbelow, the maximum rectangular image area is limited to the maximum rectangular projection area and in another embodiment, discussed further hereinbelow, the maximum rectangular image area is limited only by the projection area defined by the coordinates of the projection area determined by the corner detection module 135. Thus, the maximum area module 137 outputs to the homography transformation module 139 and the image display module 140, coordinates of the maximum rectangular projection area and the maximum rectangular image area.

In particular, in one embodiment, the maximum rectangular projection area is calculated by determining a rectangle having an aspect ratio corresponding to the aspect ratio determined by the normalization module 136. The maximum rectangular image area can be calculated by determining a rectangle having an aspect ratio corresponding to that image. Based in part on the coordinates of the corners and coordinates of the projection area determined by the corner detection module 135, the edges of each maximum rectangular area are determined. For example, a system of linear equations can be used to solve for the coordinates of the corners of the rectangle resulting in dimensions of length and width that maximize the area of the rectangle. In such a case, the length and width will be related by the aspect ratio. Other constraints on the system of equations are the locations of the corners of the projection area, which can be mapped to a Cartesian coordinate system. Alternatively, the length and width of the maximum area rectangle that minimizes the difference of the total area of the projection area and the area of the rectangle can also be determined. When a centralization point has already been determined by the centralization module 138 and is input to the maximum area module 137, an additional constraint is added which requires that the center of the rectangle corresponding to the maximum rectangular image area be at the centralization point. The addition of the centralization point constraint simplifies the system of equations. While the above-discussed process has been provided here as an example, any suitable method of determining the maximum area for display may be used.

Homography transformation module 139 accepts, as input, the coordinates of the corners of the maximum rectangular image area and the maximum rectangular projection area determined by the maximum area module 137 along with the input image data and aspect ratio. Based on these inputs, homography transformation module 139 outputs an inverse homography matrix to image display module 140.

More specifically, homography transformation module 139 comprises computer-executable process steps to derive a homography transformation for at least one input image in order to facilitate keystone correction. In one embodiment, homography transformation module 139 derives a homography transformation, and an inverse of the derived homography transformation, for each input image, individualized for each image. In another embodiment, homography transformation module derives a homography transformation, and an inverse of the derived homography transformation, once for all of multiple input images, which all share these transformations in common.

Image display module 140 accepts, as input, the inverse homography transform and the coordinates of the maximum rectangular image area and outputs pre-distorted images to each of projectors 50 to 52 in the projector array, such that each projector displays the appropriate portion of the input image on the projection surface, and such that the image is substantially centered at the centralization point while being displayed at the aspect ratio of the respective input image.

More specifically, image display module 140 comprises computer-executable process steps to cause projectors 50 to 52 to form keystone corrected image 60 corresponding to the input image. Image display module 140 provides image data which has been adjusted based on the output of homography transformation module 139 to each of the projectors 50 to 52 for display based on the maximum rectangular image area calculated by maximum area module 137 for each image.

Figure 5:
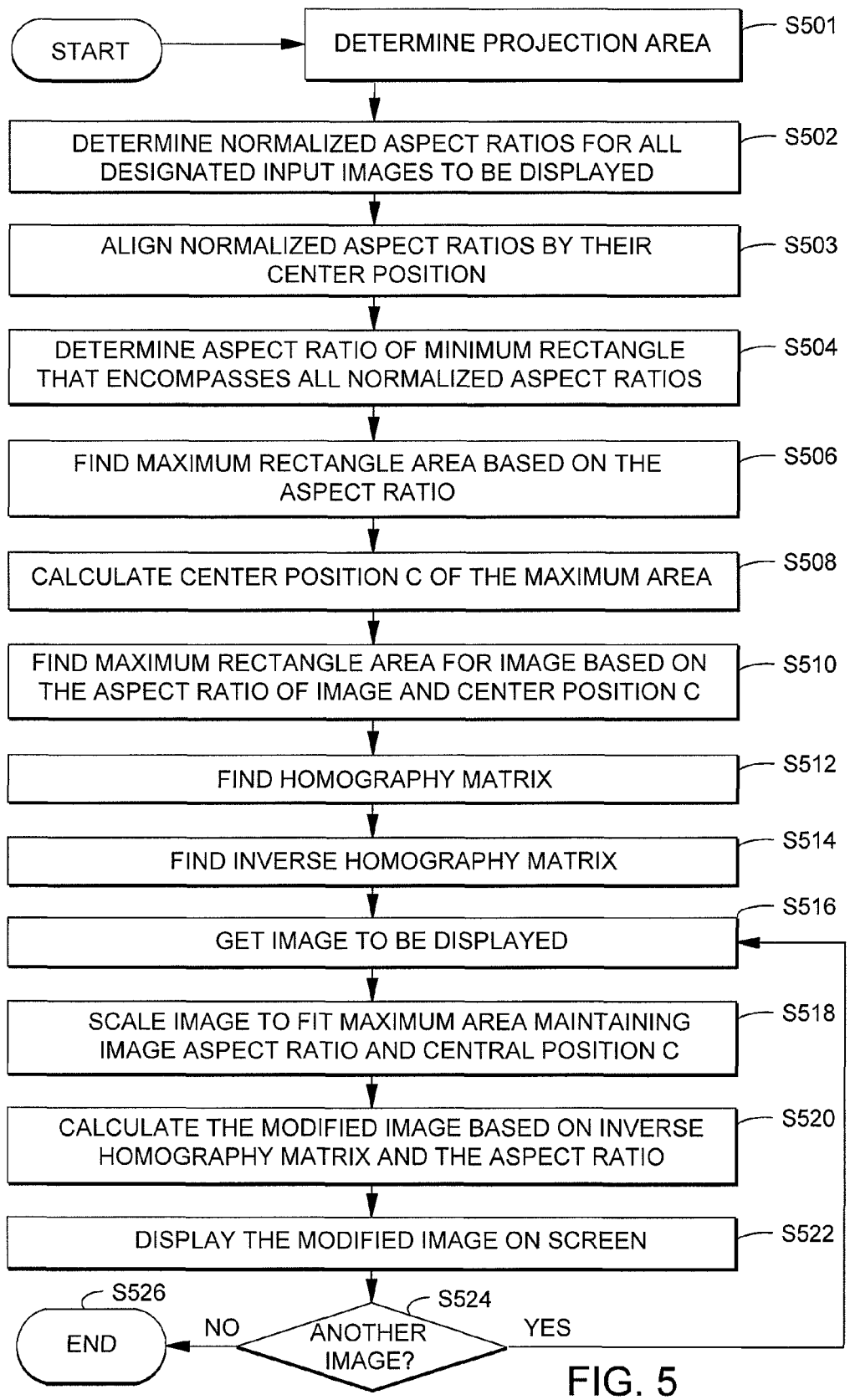
FIG. 5 is a flow diagram for explaining control of a multiprojector system according to an example embodiment.

FIG. 5 is a flow diagram for explaining control of a multiprojector system according to an example embodiment. The process steps shown in FIG. 5 are computer-executable process steps stored on a computer-readable memory medium such as at 145 on fixed disk 45, and are executed by CPU 113 of host computer 40, so as to implement a control module for control of a multiprojector system including multiple projectors arranged in a projector array. Briefly, according to the process steps shown in FIG. 5, a projection area is detected by corner detection using an image capture device which captures an image of the projection surface. Multiple images designated for display are keystone corrected and are projected at their respective aspect ratios, centered at a common centralization point in the projection area that is based on normalized aspect ratios of all of the multiple images designated for display. The normalized aspect ratios are aligned around a common central point and an aspect ratio of a minimum rectangular shape that encompasses all of the aligned normalized aspect ratios of the multiple images is determined. A maximum rectangular projection area is determined within the projection area having the determined aspect ratio and the center of that maximum rectangular projection area is designated as the centralization point. The centralization point is common to all of the multiple images designated for display.

In more detail, in step S501, corner detection module 135 captures an image of the projection area displayed by all of the projectors in the projector array, and analyzes the captured image using a Canny algorithm in order to detect the extent of the projection area.

In step 502, the normalized aspect ratios of all designated input images are determined based upon the input image data. In step S503, the normalized aspect ratios are aligned by their center position. In step S504, an aspect ratio that is suitable for a rectangle in which to display the designated images is determined, such as is discussed herein above with respect to FIGS. 4A to 4E. In step S506, a maximum rectangular projection area is determined based upon the aspect ratio determined in step S504. The maximum rectangular projection area is within the projection area extents detected in step S501. In step S508, the center position of the maximum rectangular projection area is determined. All of the images designated for display will be displayed centered about this center position. In step S510, a maximum rectangular image area is determined based upon the aspect ratio of the input image and the center point determined in step S508. In step S512 a homography matrix is derived for the maximum rectangular projection area and in step S514 an inverse homography matrix is derived from the homography matrix derived in step S512, the inverse homography matrix being output to the image display module 140. In step S516 the image to be displayed is retrieved and in step S518 the image is scaled at its aspect ratio to fit within the maximum rectangular projection area determined in step S506. In step S520 a modified, keystone-corrected, image is calculated based on the inverse homography matrix derived in step S514 and the aspect ratio of the input image. In step S522 the modified image is displayed on the projection surface. In step S524 it is determined whether another image is to be displayed. If YES at step S524, another image designated for display is retrieved and steps S516 to S524 are repeated until NO at step S524, in which case the process ends at step S526.

Figure 6A:
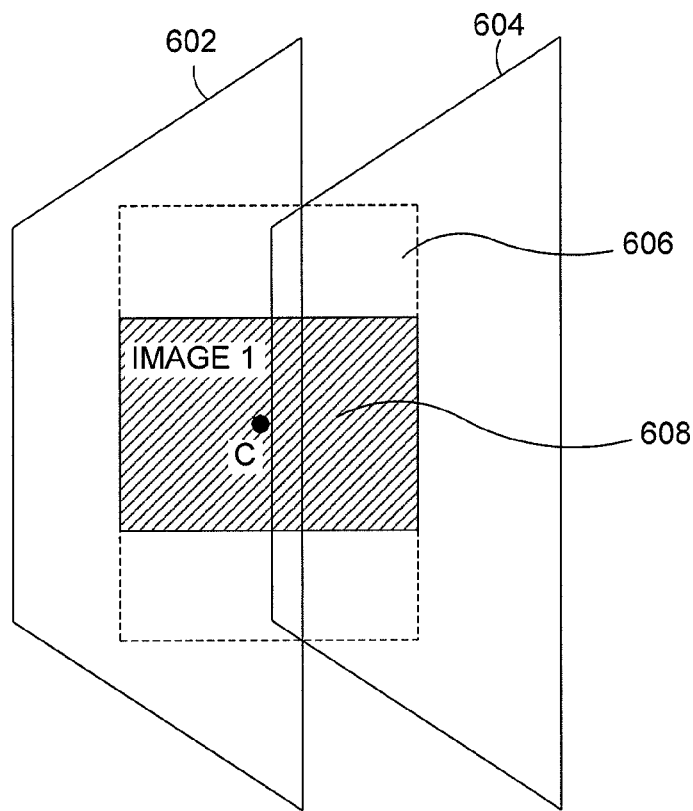
FIGS. 6A and 6B show, schematically, an example of a series of projected images according to the flow diagram shown in FIG. 5.
Figure 6B:
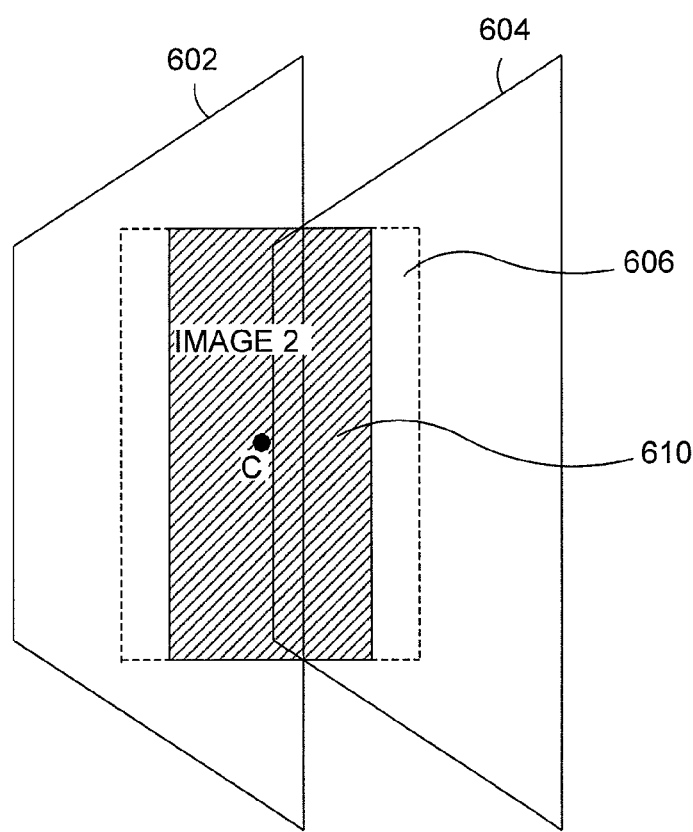

An example of the display of two designated input images according to the method shown in FIG. 5 is shown in FIGS. 6A and 6B. FIGS. 6A and 6B show two projection areas 602 and 604, respectively from two projectors in a projector array, that have a trapezoidal keystone shape. Based on the overlap of the areas 602 and 604 a projection area 603 is determined by corner detection. Within the outline of the projection area a broken line rectangle 607 is shown depicting the maximum rectangular projection area 606 based on the normalized aspect ratios of designated image 1 (FIG. 6A) and image 2 (FIG. 6B). The center C of that maximum rectangular projection area 606 is used as the centralization point to center a maximum rectangular image area 608 within the maximum rectangular projection area 606 at the aspect ratio of input image 1. As shown in FIG. 6A, the maximum rectangular image area 608 is scaled at is maximum size at its aspect ratio to fit within the maximum rectangular projection area 606. Likewise, in FIG. 6B another maximum rectangular image area 610 corresponding to image 2 is determined to fit within the maximum rectangular projection area 606 and is based on the center C of the maximum rectangular projection area 606 and the aspect ratio of image 2.

As shown in FIG. 6A, for example, the maximum rectangular image area 608 has a different aspect ratio than the maximum rectangular projection area 606, and therefore those two areas are not equal. As noted above, an inverse homography matrix is derived for the larger maximum rectangular projection area 606. However, applying that inverse homography matrix to the scaled image 1, which is scaled to fit within the maximum rectangular image area 608, may result in a calculation of a modified image 1 in step S520 which is distorted when displayed in step S522. To mitigate such possible image distortion, in at least one embodiment a quasi-image is determined that includes the image, and has an overall aspect ratio equal to the maximum rectangular projection area 606. That inverse homography matrix can be applied to the quasi-image to calculate a modified image for display. Two examples of determining such a quasi-image are described hereinbelow with momentary reference to FIGS. 9A through 9D.

Figure 9A:
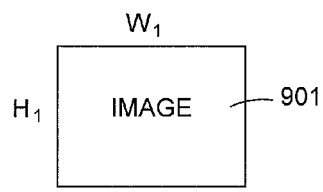
FIG. 9A shows, schematically, an example of an image designated for display.
Figure 9B:
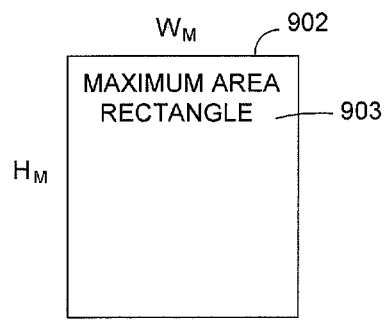
FIG. 9B shows, schematically, an example of a maximum rectangular projection area according to an example embodiment.

FIG. 9A shows an example of an image 901 designated for display having a height $H_1$ and width $W_1$. FIG. 9B shows an example of a maximum area rectangle 902 defining the maximum rectangular projection area 903 having a height $H_M$ and width $W_M$. In one embodiment shown in FIG. 9C, the image 901 (FIG. 9A) is shown as a scaled image 910 that fits within a maximum rectangular image area 904, which is within rectangle 902. The maximum rectangular image area 904 and the scaled image 910 have a width $W_M$ and a height defined by the equation $H_1 \times (W_M/W_1)$. The scaled image 910 and the maximum rectangular image area 904 are centered in the maximum rectangular projection area 903. The difference in area between the maximum rectangular projection area 903 and the maximum rectangular image area 904 is determined and accounted for as a quasi-image area, shown graphically in FIG. 9C as two areas 905, one area above and one area below the maximum rectangular image area 904. Each of the two quasi-image areas 905 has a width $W_M$ and a height defined by the equation $(H_M - (H_1 \times (W_M/W_1)))/2$. The quasi-image 906 includes the scaled image 910 and both of the quasi-image areas 905. The resulting quasi-image 906 has the same dimensions as the maximum rectangular projection area 903. In calculating a modified image in step S520, in one embodiment, the inverse homography matrix is applied to the quasi-image 906.

Figure 9C:
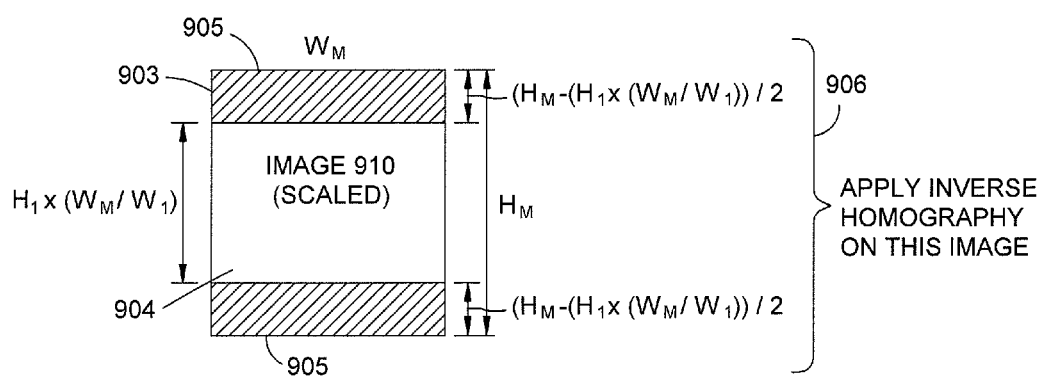
FIG. 9C shows, schematically, an example showing the image of FIG. 9A scaled along with shadow areas determined in accordance with an example embodiment.
Figure 9D:
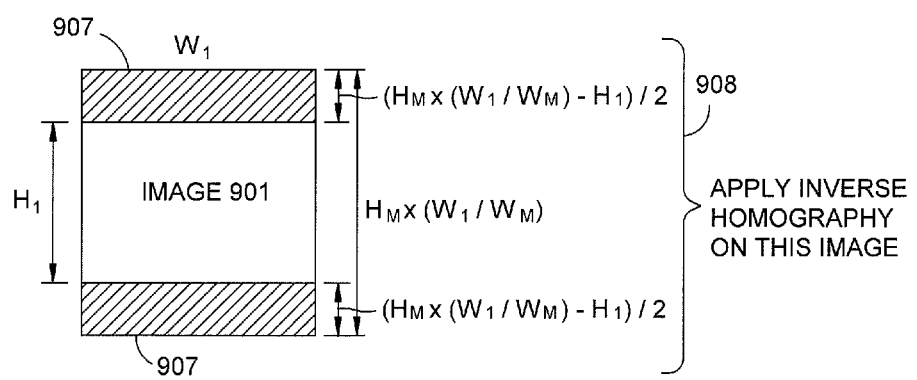
FIG. 9D shows, schematically, an example showing the image of FIG. 9A along with shadow areas determined in accordance with an example embodiment.

In another example embodiment, shown in FIG. 9D, quasi-image areas 907 are determined so that a resulting quasi-image 908 has an aspect ratio equal to the maximum rectangular projection area 903. As shown in FIG. 9D, the image 901 is not scaled and is bordered on the top and bottom by quasi-image areas 907. The quasi-image areas 907 are defined by the width of the image 901 $W_1$ and a height defined by the equation $H_M \times (W_1/W_M) - H_1)/2$. In calculating a modified image in step S520, in one embodiment, the inverse homography matrix is applied to the quasi-image 908.

One distinction between the embodiments described with respect to FIGS. 9C and 9D is that in the method corresponding to FIG. 9D, the image is not scaled before applying the inverse homography matrix to the quasi-image 908, thereby reducing steps in for determining the quasi-image 908 compared to quasi-image 910.

One feature of the method of FIG. 5 is that the homography matrix and the inverse homography matrix are only calculated one time and the result of the inverse homography matrix is applied to modify all of the designated input images for display. However, by virtue of this feature of the method shown in FIG. 5, the display of the designated image might be limited in size to be within a rectangle defined by the maximum rectangular projection area 606 determined in step S506.

Figure 7:
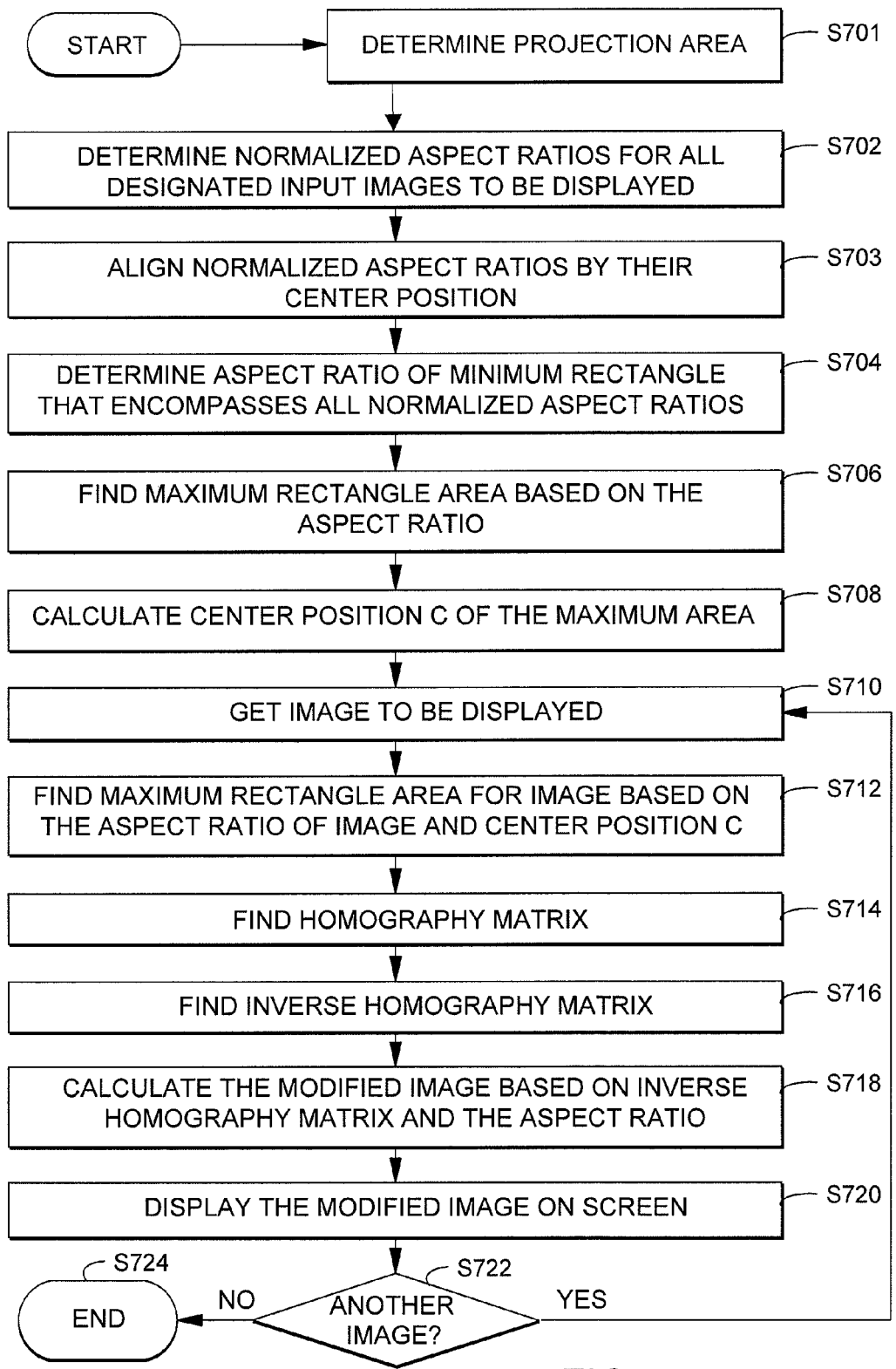
FIG. 7 is a flow diagram for explaining control of a multiprojector system according to an example embodiment.

FIG. 7 shows an alternate method to that of FIG. 5, in which the homography matrix is derived individually for each image designated for display. By virtue of the features of the method of FIG. 7, scaling of the image is ordinarily not needed because for each homography matrix, an inverse homography matrix is determined which is applied to the corresponding image. Moreover, by virtue of the features of the method of FIG. 7, the images designated for display may be displayed in a maximum rectangular image area larger than the maximum rectangular projection area.

In FIG. 7, steps S701 to S708 correspond to steps S501 to S508 in the method in FIG. 5. In step S710 an image designated for display is retrieved and in step S712 the maximum rectangular image area is determined based on the aspect ratio of the input image and the center position of the maximum rectangular projection area determined in step S706. In step S714 a homography matrix is determined for the maximum rectangular image area and in step S716 an inverse homography matrix is derived based on the homography matrix determined. In step S718 a modified image is calculated based on the inverse homography matrix and aspect ratio of the input image and in step S720 the modified image is displayed. In step S722 it is determined whether another image is designated for display. If YES at step S722, steps S710 to S722 are repeated until there is a NO at step S722, in which case the process ends at S724.

Figure 8A:
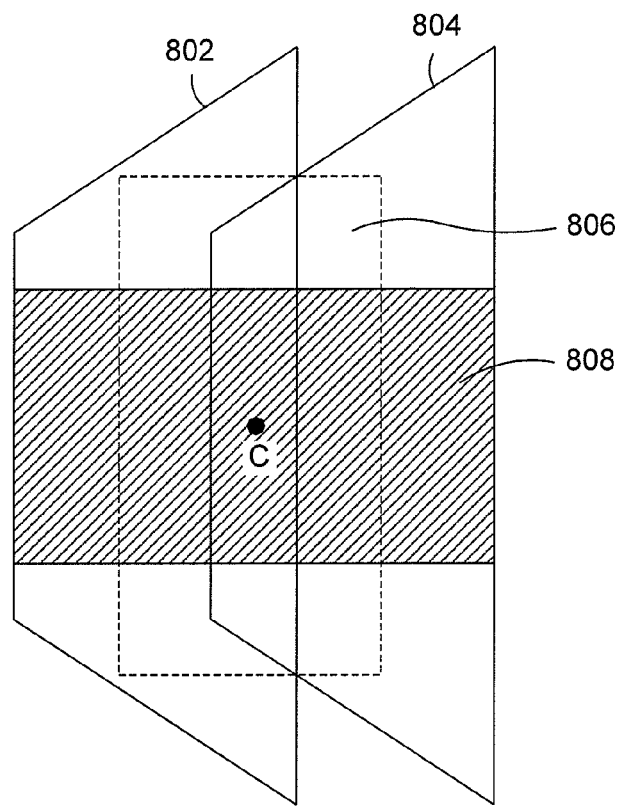
FIGS. 8A and 8B show, schematically, an example of a series of projected images according to the flow diagram shown in FIG. 7.
Figure 8B:
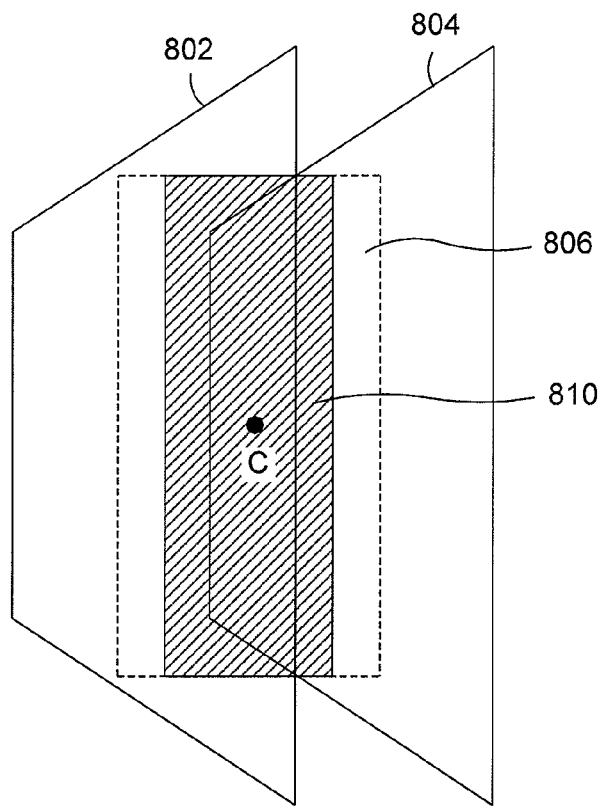

FIGS. 8A and 8B show, schematically as a progression, views of two designated input images showing how the maximum rectangular image area is determined in accordance with the control steps shown in FIG. 7 and described above. In particular, FIG. 8A shows the display of the first image in a first image maximum rectangular image area 808 in accordance with step S712. The first image maximum rectangular image area 808 is positioned in a projection area 803 formed by two overlapping individual projection areas, 802 and 804. A first maximum rectangular projection area 806 is centered at a centralization point C and determined in step S708. A rectangle 807 is shown with broken lines within the projection area 803 defined by projection areas 802 and 804 to denote the maximum rectangular projection area 806 determined in step S706.

After the first maximum rectangular image area 808 is determined, it is determined that a second designated input image exists to be displayed, in accordance with step S722. A second maximum rectangular image area 810 is determined in accordance with step S712. The second maximum rectangular image area 810 is determined to be centered at the centralization point C and is scaled around the centralization point C maintaining the aspect ratio of the second input image. The second maximum rectangular image area 810 is scaled up to its largest size while remaining within the projection area 803 defined by overlapping projection areas 802 and 804.

In each of FIGS. 8A and 8B, the resulting maximum rectangular image areas defined by rectangles 808 and 810 are used to calculate, for each designated input image, a homography matrix and an inverse homography matrix. As a result, for the same number of designated images, more calculations of homography matrix and inverse homography matrix are necessary for the method of FIG. 7 as compared to that of FIG. 5. However, the method of FIG. 7 results in the display of modified, designated input images which are displayed at a larger size within the available projection area. Accordingly, there is a tradeoff in the displayed image size between processing the images using the method of FIG. 5 and FIG. 7. However, by virtue of the features of the methods of FIGS. 5 and 7, all of the images designated for display are displayed at their respective aspect ratios and are all displayed with the same centralization point. Displaying all of the images with the same centralization point is intended to reduce the perception by the viewer that the sequence of images jump around different parts of the projection surface and that the images are distorted in size.

The normalization of aspect ratios described above and the determination of an aspect ratio for the maximum rectangular projection area are sometimes sensitive to the collective aspect ratios of all of the designated input images, and thus may be skewed by one or more images that have an aspect ratio that is quite different from the aspect ratios of other images in the plurality of images. For example, a scenario can be imagined where 100 images include 99—4×6 images and 1—8×10 image. In this example, the inclusion of the single image with an aspect ratio of 8:10 would skew the calculation of the aspect ratio of the maximum rectangular projection area even though it accounts for 1% of the images.

To account of this result, in at least one embodiment outlier images are separated from the group of images leaving only the plurality of images designated for display which are processed. Such exclusion of outlier images can be done, for example, prior to performing the steps of the methods of FIG. 5 or 7. In one embodiment, outlier images are identified based on their aspect ratios and are separated from the group of images. The number of images of each aspect ratio is counted and the number of aspect ratios in the group of images is counted in order to compute the average number of images of each aspect ratio. In the example discussed above, there are 99—4×6 images and 1—8×10 image. Since, in this example, there are only two aspect ratios, 4:6 and 8:10, the average number of images of each aspect ratio is 100/2=50. If the number of images associated with a given aspect ration is below a certain threshold of the average number, then that aspect ratio and images having that aspect ratio would be identified as outliers and excluded from the designated input images. Continuing with the aforementioned example, if the threshold of the average number is 10%, then if the threshold number of images associated with each of the two aspect ratios is 5 (10% of 50). Therefore, if there are less than 5 images associated with an aspect ratio, that particular aspect ratio and all of the images associated with that aspect ratio, are be excluded as outliers. In the foregoing example there is only one image having an aspect ration of 8:10. Therefore, that single image will be excluded from the plurality of designated images because 1 is less than the threshold of 5 images determined in the example.

Referring again to FIG. 4D, an image is shown having a height of 1 unit and a width of 6 units, having an aspect ratio of 1:6. The smaller of these dimensions is the height of 1, and thus the normalized aspect ratio is 1:6. Thus, in relation to the images shown in FIGS. 4A to 4C, some embodiments might conclude that the image shown in FIG. 4D is an outlier image, which is thus excluded from the process for normalization of aspect ratios in accordance with the example method discussed above.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A display method using a projector array, wherein the projector array comprises a plurality of projectors, which together project an image into a projection area on a projection surface, the method comprising:
   normalizing aspect ratios for all of multiple images designated for display;
   aligning the normalized aspect ratios at a common central point;
   determining an aspect ratio of a minimum rectangular shape that will encompass all of the aligned aspect ratios of the multiple images;
   determining a maximum rectangular projection area within the projection area having the same aspect ratio as the minimum rectangular shape;
   designating the center of the maximum rectangular projection area as a centralization point; and
   sequentially projecting each of all of the multiple images into the projection area, wherein each image is scaled for display at its aspect ratio and is displayed centered at the centralization point.

2. A display method according to claim 1, further comprising calculating a common homography matrix based on the maximum rectangular projection area.

3. A display method according to claim 2, wherein for each individual one of the multiple images, projecting comprises:
   scaling the image at its aspect ratio to the maximum rectangular projection area;
   applying an inverse of the common homography matrix to the scaled image so as to obtain a modified image; and
   projecting the modified image.

4. A display method according to claim 1, wherein for each individual one of the multiple images, projecting comprises:
   calculating an individualized maximum rectangular image area for the image based on the aspect ratio of the image and based on the centralization point, wherein the individualized maximum rectangular image area is within the projection area;
   calculating an individualized homography matrix for the individualized maximum rectangular image area for the image;
   applying the inverse of the individualized homography matrix to the image so as to obtain a modified image; and
   projecting the modified image.

5. A display method according to claim 1, wherein the multiple images targeted for display are obtained by excluding an outlier image from a set of plural images.

6. A display method according to claim 5, wherein the outlier image has an aspect ratio which is inconsistent with the aspect ratios of the multiple images targeted for display.

7. A display method according to claim 5, further comprising projecting the outlier image scaled at its aspect ratio to a maximum rectangular image area for the outlier image centered at a position other than the centralization point.

8. A display method according to claim 5, further comprising projecting the outlier image scaled at its aspect ratio to a maximum rectangular image area centered at the centralization point.

9. A display method according to claim 5, further including
    determining the number of different aspect ratios for all of the multiple images designated for display;
    calculating an average number of images for each different aspect ratio based on the total number of images designated for display and the number of different aspect ratios determined;
    calculating a threshold number of images for each of the different aspect ratios determined; and
    identifying for exclusion all images corresponding to each aspect ratio having fewer than the threshold number of images.

10. A display method according to claim 9, wherein calculating a threshold number of images includes multiplying a predetermined threshold percentage by the average number of images calculated.

11. The method according to claim 1, further comprising detecting the projection area by corner detection using an image capture device which captures an image of the projection surface.

12. The method according to claim 1, wherein normalizing includes, for each aspect ratio of each designated image, scaling the aspect ratio by the smaller of the width and the height of the image to calculate a normalized aspect ratio.

13. The method according to claim 12, wherein determining the aspect ratio of a minimum rectangular shape includes determining the ratio of the largest scaled aspect ratio and the smallest scaled aspect ratio.

14. A control module for a multiprojector system, wherein the multiprojector system comprises multiple projectors arranged in a projector array that comprises a plurality of projectors, which together project an image into a projection area on a projection surface, the module comprising:
    a normalization module constructed to normalize aspect ratios for all of multiple images designated for display, to align the normalized aspect ratios at a common central point, and to determine an aspect ratio of a minimum rectangular shape that will encompass all of the aligned aspect ratios of the multiple images;
    a maximum area module constructed to determine a maximum rectangular projection area within the projection area having the same aspect ratio as the minimum rectangular shape;
    a centralization module constructed to designate the center of the maximum rectangular projection area as a centralization point; and
    an image display module constructed to sequentially project each of all of the multiple images into the projection area, wherein each image is scaled for display at its aspect ratio and is displayed centered at the centralization point.

15. The control module of claim 14, wherein the maximum area module is also constructed to determine a maximum rectangular image area, wherein the maximum rectangular image area is determined based upon the aspect ratio of the image and the centralization point so as to maximize the maximum rectangular image area within the maximum rectangular projection area.

16. The control module of claim 15, further comprising:
    a homography transformation module constructed to determine a homography matrix based on the determination of the maximum rectangular projection area, and to determine an inverse of the homography matrix.

17. The control module of claim 16, further comprising:
    a corner detection module constructed to detect the projection area by corner detection using an image capture device which captures an image of a projection surface; and
    an image display module constructed to display a modified form of the image which is modified based on the inverse homography matrix and the aspect ratio of the image.

18. The control module of claim 14, wherein the maximum area module is also constructed to determine a maximum rectangular image area, wherein the maximum rectangular image area is determined based upon the aspect ratio of the image and the centralization point so as to maximize the maximum rectangular image area in the projection area.

19. The control module of claim 18, further comprising:
    a homography transformation module constructed to determine a homography matrix based on the determination of the maximum rectangular image area, and to determine an inverse of the homography matrix.

20. The control module of claim 19, further comprising:
    a corner detection module constructed to detect the projection area by corner detection using an image capture device which captures an image of a projection surface; and
    an image display module constructed to display a modified form of the image which is modified based on the inverse homography matrix and the aspect ratio of the image.

21. A projector array display apparatus comprising:
    a processor with an interface to a projector array, wherein the projector array comprises a plurality of projectors, which together, project the images into a projection area on a projection surface; and
    a memory retrievably storing a program executable by the processor,
    wherein the program causes the processor to implement a method of displaying images with the projector array, wherein the method includes the steps of:
    normalizing aspect ratios for all of multiple images designated for display;
    aligning the normalized aspect ratios at a common central point;
    determining an aspect ratio of a minimum rectangular shape that will encompass all of the aligned aspect ratios of the multiple images;
    determining a maximum rectangular projection area within the projection area having the same aspect ratio as the minimum rectangular shape;
    designating the center of the maximum rectangular projection area as a centralization point; and
    sequentially projecting each of all of the multiple images into the projection area, wherein each image is scaled for display at its aspect ratio and is displayed centered at the centralization point.

22. The apparatus according to claim 21, wherein the program stored in the memory further causes the processor to implement a method further including the step of calculating a common homography matrix based on the maximum rectangular projection area.

23. The apparatus according to claim 22, wherein the program stored in the memory further causes the processor to implement a method further including the steps of, for each individual one of the multiple images:
    scaling the image at its aspect ratio to the maximum rectangular projection area;
    applying an inverse of the common homography matrix to the scaled image so as to obtain a modified image; and
    projecting the modified image.

24. The apparatus according to claim 21, wherein the program stored in the memory further causes the processor to implement a method further including the steps of, for each individual one of the multiple images:
  calculating an individualized maximum rectangular image area for the image based on the aspect ratio of the image and based on the centralization point, wherein the individualized maximum rectangular image area is within the projection area;
  calculating an individualized homography matrix for the individualized maximum rectangular image area for the image;
  applying the inverse of the individualized homography matrix to the image so as to obtain a modified image; and
  projecting the modified image.

25. The apparatus according to claim 21, wherein normalizing includes, for each aspect ratio of each designated image, scaling the aspect ratio by the smaller of the width and the height of the image to calculate a normalized aspect ratio, and determining an aspect ratio that will encompass all of the aligned aspect ratios of the multiple images includes determining the ratio of the largest scaled aspect ratio and the smallest scaled aspect ratio.

26. A non-transitory computer readable storage medium having retrievably stored thereon a plurality of computer-executable instructions, the plurality of instructions when executed by a processor, cause the processor to perform a method of displaying images with a projector array, wherein the projector array comprises a plurality of projectors, which together, project the images into a projection area on a projection surface, the method comprising steps of:
  normalizing aspect ratios for all of multiple images designated for display;
  aligning the normalized aspect ratios at a common central point;
  determining an aspect ratio of a minimum rectangular shape that will encompass all of the aligned aspect ratios of the multiple images;
  determining a maximum rectangular projection area within the projection area having the same aspect ratio as the minimum rectangular shape;
  designating the center of the maximum rectangular projection area as a centralization point; and
  sequentially projecting each of all of the multiple images into the projection area, wherein each image is scaled for display at its aspect ratio and is displayed centered at the centralization point.

27. The non-transitory computer readable storage medium according to claim 26, wherein the method further comprises the step of calculating a common homography matrix based on the maximum rectangular projection area.

28. The non-transitory computer readable storage medium according to claim 27, wherein the method further comprises the steps of, for each individual one of the multiple images:
  scaling the image at its aspect ratio to the maximum rectangular projection area;
  applying an inverse of the common homography matrix to the scaled image so as to obtain a modified image; and
  projecting the modified image.

29. The non-transitory computer readable storage medium according to claim 26, wherein the method further comprises the steps of, for each individual one of the multiple images:
  calculating an individualized maximum rectangular image area for the image based on the aspect ratio of the image and based on the centralization point, wherein the individualized maximum rectangular image area is within the projection area;
  calculating an individualized homography matrix for the individualized maximum rectangular image area for the image;
  applying the inverse of the individualized homography matrix to the image so as to obtain a modified image; and
  projecting the modified image.

* * * * *